Nov. 17, 1964  R. S. ROOT  3,157,257
OIL IMMERSED, ACTUATED CLUTCH AND BRAKE ASSEMBLY
Filed April 4, 1963
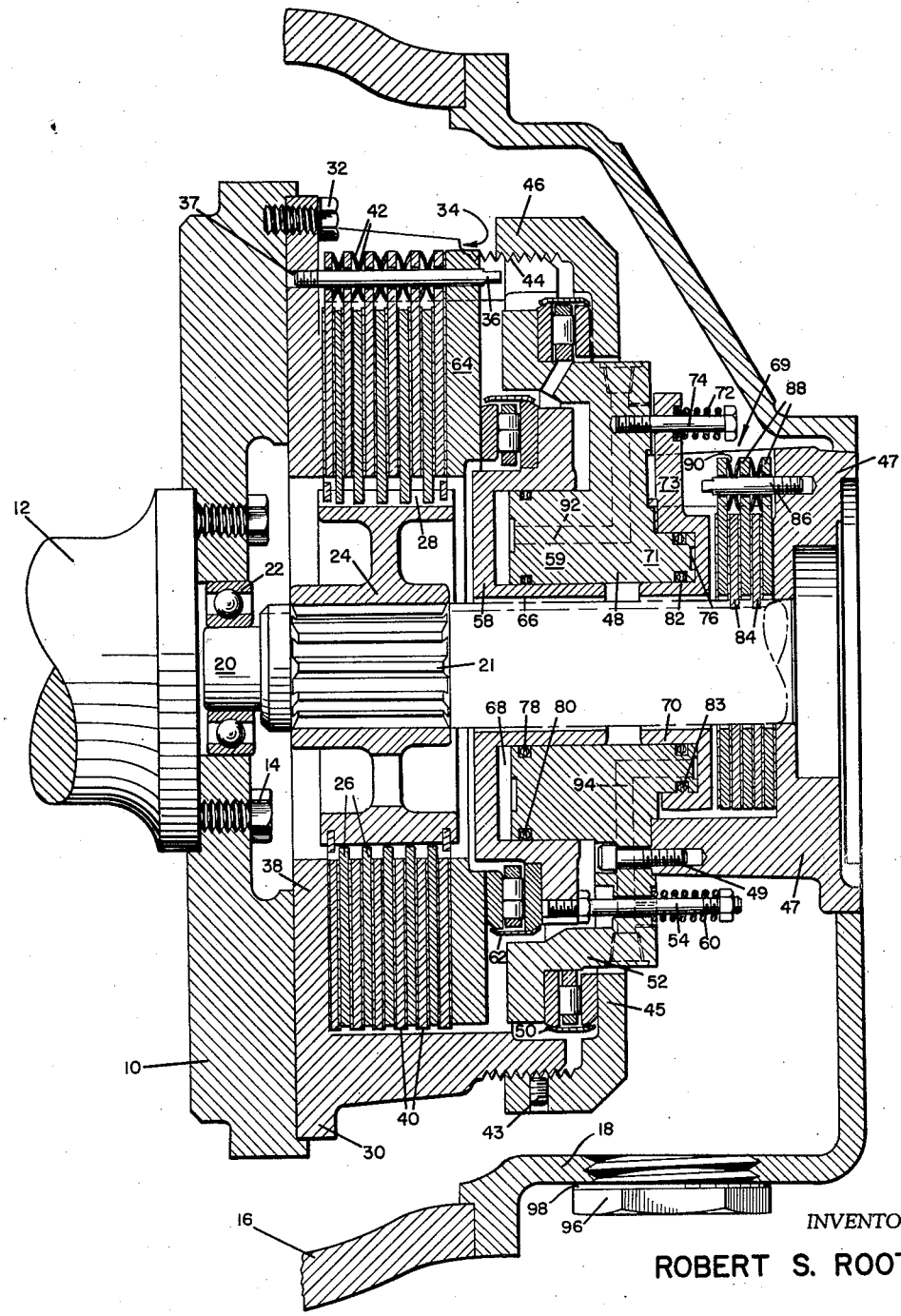
INVENTOR
ROBERT S. ROOT
BY *Karl .W. Flocks*
ATTORNEY ID 3,157,257
OIL IMMERSED, ACTUATED CLUTCH AND BRAKE ASSEMBLY
Robert S. Root, Syracuse, N.Y., assignor to Lipe-Rollway Corporation, Syracuse, N.Y., a corporation of New York
Filed Apr. 4, 1963, Ser. No. 270,666
11 Claims. (Cl. 192—18)

This invention relates to a friction clutch and more particularly to a heavy duty oil clutch and brake assembly which is hydraulically actuated and operated in oil.

Clutches used in land vehicle machines have suffered primarily from a short life. This is essentially due to excessive heat and wear of the clutch friction surfaces. It has been proposed to reduce wear and heat by running the clutch friction surfaces in cooling fluid. Such a fluid however, has a tendency to create a fluid drag resistance between the friction surfaces on the driven and driving members of the clutch particularly when it is desired to disengage the clutch. Furthermore the use of fluids, for clutch actuation as well as cooling, generally requires the application or use of oversized clutches which often cannot be used in land vehicles without substantial redesign of the entire vehicle to permit installation of the oversized clutch; in addition such oversized clutches cannot be substituted directly for dry friction clutches in the land vehicles presently in use. Manufacturers of land vehicles such as trucks, busses, special service equipment and tractors are concerned with many other problems in the construction of these vehicles and because of the high cost of design and retooling these manufacturers may be unable to economically build larger diameter clutches into the vehicles.

It is therefore an object of the present invention to provide a heavy duty clutch with greatly increased life.

It is another object of the present invention to provide an improved clutch of relatively small size which will permit direct insertion into previously constructed land vehicles and which can be inserted into new vehicles without the necessity of redesigning the vehicle to provide increased space for the improved clutch.

It is another object of the present invention to provide a hydraulically actuated oil cooled clutch and brake assembly.

It is another object to provide a clutch assembly which is economical and simple to build and install without complicated mechanical linkages.

It is another object of the present invention to provide an hydraulically actuated clutch assembly which is simply, effectively and easily operated by finger tip or automatic control.

It is another object of the present invention to provide a sealed oil clutch and brake assembly which provides accelerated transmission shifting.

It is another object of the present invention to provide a heavy duty clutch in which no adjustment is required to compensate for wear, which maintains constant torque regardless of gear and which requires no vehicle down time for adjustments.

It is another object of the present invention to provide a heavy duty clutch assembly in which the torque capacity is variable by change in hydraulic pressure and in which a relatively high torque is produced in a relatively small sized clutch with a low volume of static hydraulic fluid.

It is another object of the present invention to provide a heavy duty hydraulically operated clutch assembly having non-rotary pistons, cylinders, seals, connections and hydraulic fluid.

It is another object of the present invention to provide a heavy duty clutch wherein the driven members are positively separated to reduce idling drag.

It is another object to provide an hydraulically actuated clutch exerting no thrust on the engine crankshaft.

Other objects and the nature and advantages of the instant invention will be apparent from the following description taken in conjunction with the accompanying drawings, wherein:

FIG. 1 is a vertical sectional view of a clutch embodying the invention.

Broadly, the oil immersed and oil actuated clutch and brake assembly of the present invention embodies a clutch and auxiliary brake having their friction members immersed in a cooling fluid such as oil, for heat dissipation and lubrication. In addition, the device is hydraulically actuated so that:

(1) The clutch may be engaged and the brake not engaged;

(2) The clutch and the brake may both be disengaged, or (3) The brake may be engaged and the clutch disengaged.

The brake and clutch can never be both engaged at the same time. The clutch of the present invention in spite of its improved features is so designed to fit into existing clutch housings on existing transmissions.

In order to overcome short clutch life it is necessary to reduce wear and heat in the clutch friction members. In the present invention this is accomplished by bathing the clutch within an oil bath. Although the cooling oil prolongs the life of the clutch friction members, it also (and undesirably) sets up a fluid drag resistance between the driving and driven members when the clutch is disengaged. At times, such as when downshifting or when shifting into first gear, it is desirable to overcome this fluid drag resistance to prevent transmission gear clashing. Such gear clashing is conventionally overcome by the use of complex and expensive synchromesh transmission gears, but in the present invention it is advantageously overcome by engaging a brake mechanism to reduce the rotational rate of, or stop entirely, the driven shaft to permit the desired shifting.

In detail, an assembly of the present invention includes a driving flywheel 10 attached to a drive shaft 12 with bolts 14. The flywheel 10 and drive shaft 12 are surrounded and enclosed by a flywheel housing 16 and a transmission housing 18 which together form an oil-tight housing for a pool of cooling and lubricating fluid. The flywheel 10 has a driven transmission input shaft 20 journaled in a bearing 22 in the center of the flywheel. The transmission input shaft 20 has splined thereto, as at 21, an annular driven hub 24 about its circumference. A set of annular driven clutch-friction discs 26 are slidingly splined at 28 to the outer periphery of the driven hub 24 to allow the driven discs to move axially on the hub 24.

The driving flywheel 10 has, carried therewith, an annular flange 30 which is attached to the flywheel 10 by fasteners, such as bolts 32. Annular flange 30 has, spaced about its periphery, a series of axially extending openings 34. Each opening 34 contains a pin 36 which extends the length of the opening and is embedded in a hole 37 in the radial extending wall portion 38 of the annular flange 30. Supported from the pins 36 are a set of annular driving clutch-friction discs 40 which are adapted to slide axially on pins 36. The driving friction discs 40 are maintained in spaced relationship by Belleville springs 42 which are spaced between each pair of driving friction discs 40. Into the recess formed between each pair of driving friction discs 40, a clutch driven friction disc 26 projects in interlocking relationship. The Belleville springs 42 exert sufficient tension so that each recess is of greater thickness than the thickness of a clutch driven disc 26. Affixed to the far end of annular flange 30 opposite the flywheel 10 as by threads 44 and lock-screw 43 is a right-angle clutch cover plate 46 having a radially inwardly projecting flange 45.

Rigidly attached with respect to the transmission housing 18 is a support and actuating block 48. Block 48 is fixedly attached to the transmission housing 18 through annular support and brake member 47 and recessed bolt 49; support block 48 thus does not rotate with either the driven or the driving members. Support block 48 is provided with an outwardly radially projecting flange 52. Spaced about the periphery of annular support block 48 and contacting the surface of flange 52 facing away from the clutch is a thrust bearing 50 which when the clutch is engaged contacts the clutch-facing inner surface of flange 45, a portion of the annular right-angle clutch cover plate 46. Thus, any axial thrust against the annular flange 30 and, ultimately, against the flywheel 10 and drive shaft 12 is resisted and contained through the thrust bearings 50 by the annular support and actuating block 48. This insures that any axial thrust exerted by member 58 to engage the clutch friction members will be absorbed by the block 48 through thrust bearings 50 rather than being passed to the crankshaft 12.

Projecting freely through the inner end of the outwardly extending flange portion 52 of the support and actuating block 48, are a plurality of pins 54. The clutch side of the pins 54 are threadedly secured into the annular flange 56 of an annular axially slidable member 58 which forms a clutch facing cylinder about clutch piston portion 59 of the support block 48. Tension springs 60 are provided at the opposite ends of the pins 54 to bias the slidable annular cylinder member 58 towards the support block 48. A second set of annular thrust bearings 62 are provided between the clutch facing surface of flange 56 of the annular cylinder member 58 and a driving annular pressure plate 64 which in turn is supported on pins 36 with driving clutch friction discs 40. The inner cylindrical surface 66 of the annular clutch cylinder member 58 is spaced from driven shaft 20 so that driven shaft 20 may freely rotate with respect to the nonrotating annular clutch cylinder 58. The axial movement of clutch cylinder 58 provides a variable sized annular cylinder cavity 68 between the piston section 59 of the support and actuating block 48 and the slidable clutch cylinder member 58.

A brake assembly 69 is provided along driven shaft 20, between the annular support and brake member 47 and support block 48. As previously noted, the purpose of the brake is to overcome the fluid drag resistance of the clutch cooling fluid. Brake 69 is provided with a brake pressure plate and slidable cylinder member 70 on the brake facing piston end 71 of support block 48. Slidable cylinder member 70 (which is similar to cylinder 58) is biased towards the support block 48 by a series of tension springs 72 on pins 74 which freely pass through flange 73 of cylinder 70 and are rigidly attached to the inner end of flange 52 of the support block 48. A second variable cylinder cavity 76 is thus provided between slidable cylinder member 70 and piston end 71 of support block 48. The annular support and brake member 47 is provided with a plurality of axially extending pins 86 which in turn support a plurality of brake friction discs 88 separated by Belleville springs 90. Driven shaft 20 carries complimentary brake friction discs 84 which are slidably splined to driven shaft 20 and project into the recesses between brake discs 88.

The support and actuating block 48 is provided with hydraulic fluid passageways 92 and 94. A valve (not shown) is constructed to permit the flow of hydraulic fluid into either passageway 92 or passageway 94 but not into both passageways simultaneously. The passageways are fed through the valve from a source of hydraulic fluid under pressure. Two sets of O-rings, 78–80 and 82–83 are provided between piston 59 and cylinder 58 and between piston 71 and cylinder 70, respectively, to seal cavities 68 and 76 to prevent leakage of hydraulic fluid therefrom.

In normal rest position both the brake friction discs 88–84 and the clutch friction discs 26–40 are disengaged through the action of the Belleville springs 42 and 90. When it is desired to engage the clutch, the valve (not shown) is actuated so that hydraulic fluid, such as oil, is forced through passageway 92 into cavity 68. The pressure of oil in cavity 68 forces annular cylinder member 58 towards the clutch (against the compressive force of springs 60) where it exerts force on pressure driving plate 64 through thrust bearings 62; this force is passed on to the cooperating friction discs 26–40 which deform the Belleville springs 42 so that the clutch becomes engaged through frictional contact of the friction discs. As previously explained, this force is not passed on to crankshaft 12 but is instead resisted by flange 45.

When it is desired to shift gears, the valve is opened which permits the hydraulic fluid under force applied by tension springs 60 to flow out of chamber 68 into passageway 92 and past the valve. The release of pressure then allows Belleville springs 42 to exert pressure and thus disengage the clutch driving friction discs 40 and the clutch driven friction discs 26. At this point the gears may be shifted.

However, if it is desired to downshift, or initially to shift into first gear, it will be necessary to overcome the fluid drag imposed by the cooling oil which bathes the clutch friction discs 26 and the driving friction discs 40. This will be accomplished by turning the valves to a third position in which fluid under pressure is forced into passageway 94 and then into cavity 76. This forces cylinder member 70 against tension springs 72 and Belleville springs 90, thus engaging the brake friction discs 88–84 and stopping the rotation of driven shaft 20.

It is seen from the construction of the present clutch assembly that no adjustments are required to compensate for wear in the friction discs, since as soon as some wear takes place the axially slidable cylinders automatically compensate by moving that much distance further. For this reason it is seen that a constant torque is maintained regardless of wear and that this torque is dependent entirely on the hydraulic pressure exerted. The device uses very little static hydraulic fluid and yet is capable of producing a relatively high torque.

The cooling fluid is provided within the flywheel housing 60 and transmission housing 18 to a depth sufficient to cover the lower section of clutch friction discs 26 and driving friction discs 40. A hand-opening may be provided in transmission housing 18 and, thus, in order to retain cooling oil therein, it is necessary to provide an oil tight cover 96 and gasket 98 about the hand opening. The cooling oil within housing 16–18 may serve as a source of the hydraulic actuating fluid in which case it may be first pumped through a reservoir.

The hydraulic actuating fluid is not subjected to rotation at any time nor are the annular axially slidable members 58 or 73. Thus no centrifugal reaction of the oil or wear and leakage problems with seals in the pistons results in present assembly. It will be obvious to those skilled in the art that various changes may be made without departing from the scope of the invention and therefore the invention is not limited to what is shown in the drawing and described in the specification but only as indicated in the appended claims.

I claim:

1. A heavy-duty clutch assembly comprising a driving member; a driven shaft coaxial with said driving member; clutch means to operatively connect said driving member and said driven shaft for rotation together; brake means to prevent said driven shaft from rotating; means to control and actuate said clutch means and said brake means to prevent simultaneous engagement of both clutch and brake means, said control and actuating means comprising a stationary annular support block spaced about the periphery of said driven shaft and situated axially between said clutch means and said brake means, a clutch pressure exerting means slidably positioned with respect to the clutch-facing-end of said block and forming therebetween a first expansible cavity, a brake pressure exerting means slidably positioned with respect to the brake-facing-end of said block and forming therebetween a second expansible cavity, means for directing hydraulic fluid under pressure into said first expansible cavity to engage said clutch, and means for directing hydraulic fluid under pressure into said second cavity to engage said brake; a housing about said clutch assembly; and wherein said support block comprises a radially outwardly extending flange, wherein said driving member comprises an extension projecting radially inwardly on the brake-facing-end of said support block flange; and means between said driving means extension and said block flange to transfer the clutch actuating pressure from said driving means to said support block so that thrust is not exerted through said driving means.

2. A device in accordance with claim 1 wherein said housing comprises means to retain cooling fluid therein and wherein a pool of cooling oil is maintained in said housing, the level of said pool being sufficiently high to bathe said clutch means.

3. A device in accordance with claim 2 wherein said pool of cooling oil is the source of said hydraulic fluid.

4. A device in accordance with claim 1 wherein said means to control and actuate said clutch and brake is capable of actuating said clutch and brake in only the following three positions:
(1) Clutch disengaged and brake disengaged;
(2) Clutch engaged and brake disengaged; and
(3) Clutch disengaged and brake engaged.

5. A device in accordance with claim 1 wherein said clutch pressure exerting means is spring biased towards said support block.

6. A device in accordance with claim 5 wherein said brake pressure exerting means is spring biased towards said support block.

7. A device in accordance with claim 1 wherein said driving member extension comprises an annular flange having an L-shaped cross section with the base of the L projecting radially inwardly towards said support block, wherein said support block flange extends radially outwardly on the clutch-side of said inwardly projecting L-base, and wherein said means to transfer clutch actuating pressure to said block lying between said outwardly extending block flange and said inwardly projecting L-base so that actuating pressure exerted on said clutch does not exert thrust through said driving means comprises thrust bearings.

8. A device in accordance with claim 7 wherein thrust bearings lie between said clutch pressure exerting means and said clutch so that pressure is exerted to actuate said clutch through said thrust bearings.

9. A device in accordance with claim 1 wherein said clutch means comprises a plurality of annular driving friction discs projecting from said driving means and a plurality of annular driven friction discs projecting from said driven shaft between said driving friction discs, said device comprising spring means to bias said friction discs in separated relationship.

10. A device in accordance with claim 1 wherein said clutch pressure exerting means and said brake pressure exerting means each comprise annular axially extending walls which slidably engage said support block to form said expansible cavities.

11. A device in accordance with claim 1 wherein said clutch pressure exerting means and said brake pressure exerting means are restrained from rotating.

References Cited by the Examiner
UNITED STATES PATENTS

| | | |
|---|---|---|
| 1,364,392 | 1/21 | Macho. |
| 2,055,970 | 9/36 | Fippard. |
| 2,226,309 | 12/40 | Gleasman. |
| 3,011,608 | 12/61 | Hansen. |
| 3,090,257 | 5/63 | Schjolin et al. |

FOREIGN PATENTS

| | | |
|---|---|---|
| 213,165 | 6/60 | Austria. |
| 956,237 | 7/49 | France. |

DAVID J. WILLIAMOWSKY, *Primary Examiner.*